(12) United States Patent
Wilkey et al.

(10) Patent No.: US 8,058,346 B2
(45) Date of Patent: *Nov. 15, 2011

(54) MONOVINYLARENE CONJUGATED DIENE COPOLYMER COMPOSITIONS FOR ACRYLATE BLENDS

(75) Inventors: John D. Wilkey, Owasso, OK (US); Carleton E. Stouffer, Bartlesville, OK (US); Steven D. Bridges, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/839,139

(22) Filed: Jul. 19, 2010

(65) Prior Publication Data

US 2010/0286340 A1 Nov. 11, 2010

Related U.S. Application Data

(63) Continuation of application No. 10/984,297, filed on Nov. 9, 2004, now Pat. No. 7,776,965.

(51) Int. Cl.
*C08L 53/02* (2006.01)
(52) U.S. Cl. ............................................ 525/89; 525/98
(58) Field of Classification Search .................... 525/89, 525/98
See application file for complete search history.

(56) References Cited

U.S. PATENT DOCUMENTS

| | | | |
|---|---|---|---|
| 4,386,190 A | 5/1983 | Bailey | |
| 5,130,377 A | 7/1992 | Trepka et al. | |
| 5,227,419 A | 7/1993 | Moczygemba et al. | |
| 5,545,690 A | 8/1996 | Trepka et al. | |
| 5,777,030 A | 7/1998 | Hanes et al. | |
| 5,910,546 A | 6/1999 | Trepka | |
| 6,265,485 B1 | 7/2001 | Trepka | |
| 6,420,486 B1 | 7/2002 | DePorter et al. | |
| 6,444,755 B1 | 9/2002 | DePorter et al. | |
| 6,835,778 B2 | 12/2004 | Swisher | |
| 7,193,014 B2 | 3/2007 | Wilkey et al. | |
| 7,776,965 B2 * | 8/2010 | Wilkey et al. | 525/89 |
| 2004/0059057 A1 | 3/2004 | Swisher | |
| 2006/0100371 A1 | 5/2006 | Foss et al. | |

FOREIGN PATENT DOCUMENTS

| | | |
|---|---|---|
| EP | 1236747 | 9/2002 |
| WO | 03099925 | 12/2003 |
| WO | 2005083000 | 9/2005 |

OTHER PUBLICATIONS

International Search Report and Written Opinion, PCT/US2005/039320, Feb. 28, 2006, 12 Pages.

* cited by examiner

*Primary Examiner* — Jeffrey Mullis
(74) *Attorney, Agent, or Firm* — Fletcher Yoder

(57) ABSTRACT

The present invention relates to monovinylarene-conjugated diene copolymer compositions adapted for blendability with acrylate polymers. In some embodiments, such compositions are provided that are particularly resistant to blocking when stored in pellet form.

25 Claims, No Drawings

MONOVINYLARENE CONJUGATED DIENE COPOLYMER COMPOSITIONS FOR ACRYLATE BLENDS

CROSS REFERENCE TO RELATED APPLICATIONS

This application is a continuation of U.S. application Ser. No. 10/984,297, entitled MONOVINYLARENE CONJUGATED DIENE COPOLYMER COMPOSITIONS FOR ACRYLATE BLENDS, filed Nov. 9, 2004, now U.S. Pat. No. 7,776,965, the specification of which is hereby incorporated by reference in its entirety.

BACKGROUND OF THE INVENTION

The present invention relates generally to the field of polymer chemistry. More particularly, it concerns specific formulations of monovinylarene-conjugated diene block copolymers adapted for blendability with other polymers while still maintaining desired performance characteristics. In some embodiments, such compositions are provided that are particularly resistant to blocking when stored in pellet form.

Various formulations of monovinylarene-conjugated diene block copolymers have long been researched and sought after, including blends with other polymers such as, but not limited to, crystal polystyrene and acrylate polymers. It is generally desirable that such monovinylarene-conjugated diene polymers have low cost, high clarity, low haze, tough physical characteristics, and be easy to handle, store and process.

Unfortunately, measures taken to address a given objective are often at the expense of other objectives. For example, adding increased amounts of polystyrene or acrylate polymers to a clear monovinylarene-conjugated diene block copolymer system may result undesirably in degraded optical characteristics such as haze. Also, until a particular polymer formulation is actually synthesized and tested, it is often difficult or impossible to predict what the physical properties will be.

Since polymers are often shipped and stored in pellet form, the blocking characteristics of a polymer system can also be a critical factor, even where an otherwise suitable polymer system has been identified. In this context, blocking refers to any tendency of a material to agglomerate, especially in the case of resin pellets sticking to themselves during storage or processing.

There continues to be a need for compositions and methods directed at achieving objectives including the foregoing, particularly in a cost efficient manner.

SUMMARY OF THE INVENTION

The invention provides monovinylarene-conjugated diene block copolymer compositions and methods for their manufacture. In one aspect, the monovinylarene-conjugated diene block copolymer comprises at least two modes. In another aspect, the monovinylarene-conjugated diene block copolymer comprises at least one tapered block. Tapered blocks can be formed by various methods known in the art, such as controlled monomer addition, or polymerization of a simultaneous injection of monovinylarene and conjugated diene in the presence of a polymerization initiator, generally in the presence of a randomizer.

In another aspect, the monovinylarene in the tapered block(s) of the block copolymer can comprise less than 25 wt % of the block copolymer. In another aspect, the block copolymer can comprise at least a first and a second charge of monovinylarene forming monoblocks preceding the tapered block(s). The first monovinylarene charge can have a weight ratio to the second charge in the range of 1:2 to 2:1, for example, and a monoblock formed from a first charge of monovinylarene in the block copolymer preceding the tapered blocks can have a molecular weight in the range of 25,000 to 65,000 gram per mole. In additional aspects, the block copolymer can comprise from 30 to 40 wt % diene, and have a blocking force of less than 200 lb.

Advantages and other features of the invention will become apparent from the following description and from the claims.

DESCRIPTION OF ILLUSTRATIVE EMBODIMENTS

In one embodiment, the invention relates to a composition comprising a monovinylarene-conjugated diene block copolymer, wherein:
(i) the block copolymer has at least two modes;
(ii) the block copolymer comprises at least one tapered block;
(iii) the monovinylarene in the at least one tapered block comprises less than 25 wt % of the block copolymer;
(iv) the block copolymer comprises at least 30 wt % diene; and
(v) the block copolymer has a blocking force of less than 200 lb.

Unless specified to the contrary or apparent from the plain meaning of a phrase, the word "or" has the inclusive meaning. The adjectives "first," "second," and so forth are not to be construed as limiting the modified subjects to a particular order in time, space, or both, unless specified to the contrary. A "copolymer" is used herein to refer to any polymer comprising at least two types of units, e.g., two types of units, three types of units, etc.

The basic starting materials and polymerization conditions for preparing monovinylarene-conjugated diene block copolymers are disclosed in, e.g., U.S. Pat. Nos. 4,091,053; 4,584,346; 4,704,434; 4,704,435; 5,130,377; 5,227,419; 6,265,484; 6,265,485; 6,420,486; and 6,444,755, which are hereby incorporated herein by reference. The techniques taught therein are generally applicable to the preparation of the monovinylarene-conjugated diene rubbers discussed below.

"Monovinylarene," as used herein, refers to an organic compound containing a single carbon-carbon double bond, at least one aromatic moiety, and a total of 8 to 18 carbon atoms, such as 8 to 12 carbon atoms. Exemplary monovinylarenes include, but are not limited to, styrene, alpha-methylstyrene, 2-methylstyrene, 3-methylstyrene, 4-methylstyrene, 2-ethylstyrene, 3-ethylstyrene, 4-ethylstyrene, 4-n-propylstyrene, 4-t-butylstyrene, 2,4-dimethylstyrene, 4-cyclohexylstyrene, 4-decylstyrene, 2-ethyl-4-benzylstyrene, 4-(4-phenyl-n-butyl)styrene, 1-vinylnaphthalene, 2-vinylnaphthalene, and mixtures thereof. In one embodiment, the monovinylarene is styrene. A unit of polymer, wherein the unit is derived from polymerization of a monovinylarene monomer, is a "monovinylarene unit."

"Conjugated diene," as used herein, refers to an organic compound containing conjugated carbon-carbon double bonds and a total of 4 to 12 carbon atoms, such as 4 to 8 carbon atoms. Exemplary conjugated dienes include, but are not limited to, 1,3-butadiene, 2-methyl-1,3-butadiene, 2-ethyl-1,3-butadiene, 2,3-dimethyl-1,3-butadiene, 1,3-pentadiene, 3-butyl-1,3-octadiene, and mixtures thereof. In one embodiment, the conjugated diene can be 1,3-butadiene or isoprene.

A unit of polymer, wherein the unit is derived from polymerization of a conjugate diene monomer, is a "conjugated diene unit."

A "monovinylarene-conjugated diene block copolymer" is a polymer comprising monovinylarene units and conjugated diene units. The polymer comprises one or more blocks, wherein each block comprises monovinylarene units or conjugated diene units. Any particular block can comprise either or both monovinylarene units or conjugated diene units. If it comprises only one type of units, it can be termed a "monoblock." If it comprises both, it can be a random block, a tapered block, a stepwise block, or any other type of block.

A block is "tapered" when both (a) the mole fraction of conjugated diene units in a first section of the block is higher than the mole fraction of conjugated diene units in a second section of the block, wherein the second section of the block is closer to a given end of the block and (b) condition (a) is true for substantially all sections of the block. (Depending on the size of the sections being considered, condition (a) may not be true for all sections, but if so, will be not true at no more than about the level expected by chance).

A block is "stepwise" when a first section of the block contains substantially all monovinylarene units of the block and a second section of the block contains substantially all conjugated diene units of the block. In light of the above definition, the first section is not necessarily prior to the second section in time, space, or any other parameter.

A block is "random" when the mole fractions of conjugated diene units and monovinylarene units in a section of the block are substantially the same as the mole fractions of conjugated diene units and monovinylarene units in the entire block. This does not preclude the possibility of sections of the block having regularity (i.e., appearing non-random), but such regular sections will typically be present at no more than about the level expected by chance.

Generally, each block is formed by polymerizing the monomer or mixture of monomers from which the desired units of the block are derived. The polymerization process will generally be amenable to a relative lack of change in process parameters between different blocks, but the skilled artisan, having the benefit of the present disclosure, may make some minor changes in process parameters between different blocks as a matter of routine experimentation. The following descriptions of the polymerization process will generally apply to the formation of all types of blocks in the inventive polymer, although certain descriptions may be of more or less value to forming one or more of the types of blocks in the inventive polymer.

The polymerization process can be carried out in a hydrocarbon diluent at any suitable temperature in the range of from about −100° C. to about 150° C., such as from about 0° C. to about 150° C., and at a pressure sufficient to maintain the reaction mixture substantially in the liquid phase. In one embodiment, the hydrocarbon diluent can be a linear or cyclic paraffin, or mixtures thereof. Exemplary linear or cyclic paraffins include, but are not limited to, pentane, hexane, octane, cyclopentane, cyclohexane, and mixtures thereof, among others. In one embodiment, the paraffin is cyclohexane.

The polymerization process can be carried out in the substantial absence of oxygen and water, such as under an inert gas atmosphere.

The polymerization process can be performed in the presence of an initiator.

In one embodiment, the initiator can be any organomonoalkali metal compound known for use as an initiator. In a further embodiment, the initiator can have the formula RM, wherein R is an alkyl, cycloalkyl, or aryl radical containing 4 to 8 carbon atoms, such as an n-butyl radical, and M is an alkali metal, such as lithium. In a particular embodiment, the initiator is n-butyl lithium. Other initiators can also be used, including but not limited to sec-butyl lithium and t-butyl lithium.

The amount of initiator employed can depend upon the desired polymer or block molecular weight, as is known in the art and is readily determinable, making due allowance for traces of reaction poisons in the feed streams.

The polymerization process can further involve the inclusion of small amounts of randomizers. In one embodiment, the randomizer can be a polar organic compound, such as an ether, a thioether, or a tertiary amine. In another embodiment, the randomizer can be a potassium salt or a sodium salt of an alcohol. The randomizer can be included in the hydrocarbon diluent to improve the effectiveness of the initiator, to randomize at least part of the monovinylarene monomer in a mixed monomer charge, or both. The inclusion of a randomizer can be of value when forming a random or tapered monovinylarene-conjugated diene block of the present polymer.

Exemplary randomizers include, but are not limited to, dimethyl ether, diethyl ether, ethyl methyl ether, ethyl propyl ether, di-n-propyl ether, di-n-octyl ether, anisole, dioxane, 1,2-dimethoxyethane, 1,2-diethoxypropane, dibenzyl ether, diphenyl ether, 1,2-dimethoxybenzene, tetrahydrofuran, potassium tert-amylate, dimethyl sulfide, diethyl sulfide, di-n-propyl sulfide, di-n-butyl sulfide, methyl ethyl sulfide, dimethylethylamine, tri-n-ethylamine, tri-n-propylamine, tri-n-butylamine, trimethylanine, triethylamine, tetramethylethylenediamine, tetraethylethylenediamine, N,N-di-methylaniline, N-methyl-N-ethylaniline, N-methylmorpholine, and mixtures thereof, among others.

When forming a particular block, each monomer charge or monomer mixture charge can be polymerized under solution polymerization conditions such that the polymerization of each monomer charge or monomer mixture charge, to form the particular block, is substantially complete before charging a subsequent charge. "Charging," as used herein, refers to the introduction of a compound to a reaction zone, such as the interior of a reactor vessel.

Though not to be bound by theory, if an initiator is included in a charge, a block will typically form either de novo or by addition to the end of an unterminated, previously-formed, block. Further not to be bound by theory, if an initiator is not included in a charge, a block will typically only form by addition to the end of an unterminated, previously-formed, block.

A coupling agent can be added after polymerization is complete. Suitable coupling agents include, but are not limited to, di- or multivinylarene compounds; di- or multiepoxides; di- or multiisocyanates; di- or multialkoxysilanes; di- or multiimines; di- or multialdehydes; di- or multiketones; alkoxytin compounds; di- or multihalides, such as silicon halides and halosilanes; mono-, di-, or multianhydrides; di- or multiesters, such as the esters of monoalcohols with polycarboxylic acids; diesters which are esters of monohydric alcohols with dicarboxylic acids; diesters which are esters of monobasic acids with polyalcohols such as glycerol; and mixtures of two or more such compounds, among others.

Useful multifunctional coupling agents include, but are not limited to, epoxidized vegetable oils such as epoxidized soybean oil, epoxidized linseed oil, and mixtures thereof, among others. In one embodiment, the coupling agent is epoxidized soybean oil. Epoxidized vegetable oils are commercially available under the tradename Vikoflex™ from Atofina Chemicals (Philadelphia, Pa.).

If coupling is to be performed, any effective amount of the coupling agent can be employed. In one embodiment, a stoichiometric amount of the coupling agent relative to active polymer alkali metal tends to promote maximum coupling. However, more or less than stoichiometric amounts can be used for varying coupling efficiency where desired for particular products.

Following completion of the coupling reaction, if any, the polymerization reaction mixture can be treated with a terminating agent such as water, carbon dioxide, alcohol, phenols, or linear saturated aliphatic mono- or di-carboxylic acids, to remove alkali metal from the block copolymer or for color control.

After termination, if any, the polymer cement (polymer in polymerization solvent) usually contains about 10 to 40 weight percent solids, more usually 20 to 35 weight percent solids. The polymer cement can be flashed to evaporate a portion of the solvent so as to increase the solids content to a concentration of about 50 to about 99 weight percent solids, followed by vacuum oven or devolatilizing extruder drying to remove the remaining solvent.

The block copolymer can be recovered and worked into a desired shape, such as by milling, extrusion, or injection molding. The block copolymer can also contain additives such as antioxidants, antiblocking agents, release agents, fillers, extenders, dyes, etc.

In the present invention, the monovinylarene-conjugated diene block copolymer is multi-modal. Analytically, this is evidenced by a population of block copolymer molecules having two or more peaks in a histogram of the population's molecular weight distribution. In practice, each injection or charge of a polymerization initiator results in an additional mode. For example, a bimodal block copolymer is formed through the injection of at least two polymerization initiator charges, and so on. As another example, it will be appreciated that multi-modal copolymers can be prepared by blending unimodal copolymers.

In the present invention, the monovinylarene-conjugated diene block copolymers generally have at least one tapered block. In one embodiment, the monovinylarene-conjugated diene block copolymer has from 1 to 3 tapered blocks, inclusive. In another embodiment, the monovinylarene-conjugated diene block copolymer comprises two or three tapered blocks. In one embodiment, the monovinylarene-conjugated diene block copolymer comprises two or three tapered blocks which are adjacent (i.e., directly bonded to each other).

In some embodiments, the block copolymers are selected or prepared such that the monovinylarene in the tapered portion comprises less than 25 wt % of the block copolymer. In other embodiments, a lower range may be desirable, such as less than 20%, less than 18%, 16%, 14%, 12%, etc. The tapered portion as a whole is sometimes referred to herein and in the claims as "the at least one tapered block."

In some embodiments, the block copolymers are selected or prepared such that they comprise two monoblocks of monovinylarene. As an example, these monoblocks can be formed by sequential first and second charges of monovinylarene. In some embodiments, these monoblocks can be selected or prepared such that the first charge has a weight ratio to the second charge in the range of 1:2 to 2:1. Other narrower ranges may also be desired for the ratio of first monoblock to second monoblock, such as 1:2 to 1:1, or 2:1 to 1:1, etc. In some embodiments, a broader ratio may also be desired such as 1:3 to 3:1.

In some embodiments, the block copolymers are selected or prepared such that they comprise from 30 to 40 wt % conjugated diene. Narrower ranges may also be desired in particular embodiments, such as 30 to 32 wt %, 30 to 34 wt %, 30 to 36 wt %, 30 to 38 wt %, 32 to 34 wt %, 32 to 36 wt %, 32 to 38 wt %, 34 to 36 wt %, 34 to 38 wt %, 36 to 38 wt %, greater than 32 wt %, greater than 34 wt %, greater than 36 wt %, greater than 38 wt %, greater than 40 wt %, etc.

In some embodiments, the block copolymer is selected or prepared such that a monoblock formed from a first charge of monovinylarene in the block copolymer preceding the tapered blocks has a molecular weight in the range of 25,000 to 65,000 gram per mole. This measure, which is generally taken immediately following the first charge of monovinylarene, is sometimes referred to as pre-molecular weight (Pre-MW). Other ranges may also be desired, such as 20,000 to 30,000 g/mol, 20,000 to 40,000 g/mol, 20,000 to 50,000 g/mol, 20,000 to 60,000 g/mol, 20,000 to 70,000 g/mol, 30,000 to 40,000 g/mol, 30,000 to 50,000 g/mol, 30,000 to 60,000 g/mol, 30,000 to 70,000 g/mol, 40,000 to 50,000 g/mol, 40,000 to 60,000 g/mol, 40,000 to 70,000 g/mol, 50,000 to 60,000 g/mol, 50,000 to 70,000 g/mol, 60,000 to 70,000 g/mol, greater than 20,000 gram/mol, greater than 30,000 gram/mol, greater than 40,000 gram/mol, greater than 50,000 gram/mol, greater than 60,000 gram/mol, etc.

In some embodiments, the block copolymer is selected or prepared such that it has a blocking force of less than 200 lb. Other threshold limits for blocking force may also be desired, such as less than 175 lb, 150 lb, 125 lb, 100 lb, 75 lb, 50 lb, 25 lb, 10 lb, 5 lb, etc.

In this context, "blocking force" refers to the amount of force required to break apart pellets of the block copolymer according to the following standardized test. First, the block copolymer is formed into pellets, by the method described below, for example. Next, three hundred grams of sample pellets are placed in a PVC cylinder having an internal diameter of 3 inches, and a 2.5 kilogram weight is placed on top of the pellets. The cylinder and contents are placed in a forced air oven at 150° F. for 90 hours. After cooling to room temperature, the weight and cylinder are removed from the pellets and the pellet aggregate is placed in an Instron model 4505- and tested in compression. The anti-blocking property of the samples is specified by the pounds force required to break apart the pellet aggregate.

In some embodiments, the block copolymer is selected or prepared such that each mode of the block copolymer comprises terminal monovinylarene linkages, wherein the terminal monovinylarene linkages collectively comprise less than 10 wt % of the block copolymer. These terminal monovinylarene linkages may be present either as monoblocks, or as terminal portions of tapered blocks.

In some embodiments, the block copolymer is selected or prepared such that it has a melt flow from 3 to 12 grams per 10 minutes at 200° C./5 kg. Other ranges may also be desired, such as 3.2 to 6.9 grams per 10 minutes, greater than 3 grams per 10 minutes, less than 10 grams per 10 minutes, etc.

As will be evident by reference to the examples, in some embodiments, the block copolymer is prepared by forming and coupling the following polymer chain structures:

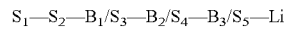

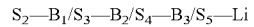

wherein S represents monovinylarene blocks, B/S represents tapered blocks of conjugated diene/monovinylarene and Li is residue from a monoalkali metal initiator.

In some embodiments, the block copolymer is prepared by a first initiator charge that is smaller than a second initiator charge. Other specifications as to the relationship between the initiator charges may also be desired. For example, in some embodiments, the ratio of the first initiator charge to the second initiator charge can be in the range of 1:1 to 1:2.

As previously indicated, in some embodiments, the composition can contain additives such as antioxidants, antiblocking agents, release agents, fillers, extenders, dyes, etc. In some embodiments, the composition is selected for prepared such that it contains a specific amount of such additives. For example, some embodiments may comprise a microcrystalline wax, antioxidants or other additives in amounts from 0.05 to 0.5 wt % of the composition. Other ranges and threshold values may also be desired, such as 0.1 to 0.5 wt %, 0.1 to 0.4 wt %, 0.1 to 0.3 wt %, 0.1 to 0.2 wt %, 0.2 to 0.3 wt %, 0.2 to 0.4 wt %, 0.2 to 0.5 wt %, 0.3 to 0.4 wt %, 0.3 to 0.5 wt %, less than 0.4 wt %, less than 0.3 wt %, less than 0.2 wt %, etc.

Various compositions under the present invention can be blended with other polymers to obtain desired economic and performance characteristics. As an example, various target characteristics of the blended material might include an acceptably low haze, and high values for flexural modulus and various measures of impact strength. The desired ranges for these parameters will generally depend on the intended application for the polymer. Where an application calls for a clear polymer, it may be desired for the blend to have haze values less than 2%, 1.5%, etc. Regarding flexural modulus, various applications may call for the blend to have values over a given threshold, which might be anywhere from 100-350 kpsi, as an example. Generally, the higher the better. Regarding impact strength, in the context of notched izod testing, as an example, various applications may call for values over a given threshold, which might be anywhere up to 5 ft-lb/in or above, as an example. Regarding impact strength, in the context of an instrumented falling dart test, various applications may call for values over a given threshold, which might be anywhere from 20-100 in-lb, as an example. In particular, some embodiments are particularly suited for blending with acrylate polymers. As an example, an objective of such blends might be to combine the impact resistance of a monovinylarene-conjugated diene block copolymer with the structural and economic aspects of acrylate-based polymers. Acrylate polymers may include, as examples, polymers based on alkyl acrylates, alkyl methacrylates, or both. In this context, alkyl acrylates are organic compounds having the formula $CH_2=CHC(=O)OR$, wherein R is an organic moiety. As an example, R can have from 1 to about 6 carbon atoms (e.g., methyl acrylate, ethyl acrylate, propyl acrylate, butyl acrylate, pentyl acrylate, and hexyl acrylate). Alkyl methacrylates are organic compounds having the formula $CH_2=C(CH_3)C(=O)OR$, wherein R is an organic moiety. As an example, R can have from 1 to about 6 carbon atoms (methyl methacrylate, ethyl methacrylate, propyl methacrylate, butyl methacrylate, pentyl methacrylate, and hexyl methacrylate). In the context of the present invention, acrylate polymers may also refer to acrylate-based blends and copolymers, such as blends and copolymers of acrylates with styrene.

In some embodiments, the invention provides methods for producing compositions comprising monovinylarene-conjugated diene block copolymers. The steps involved in such methods can include the preparation or selection of any combination of the above aspects. As an example, in one embodiment, a method is provided for producing a monovinylarene-conjugated diene block copolymer, comprising the following steps:
(i) sequentially contacting under polymerization conditions at least one monovinylarene monomer, an organo-monoalkali metal initiator, at least one conjugated diene monomer, and thereafter coupling with a polyfunctional coupling agent to form the block copolymer,
(ii) wherein the block copolymer has at least two modes;
(iii) wherein the block copolymer comprises at least one tapered block;
(iv) wherein the monovinylarene in the at least one tapered block comprises less than 25 wt % of the block copolymer;
(v) wherein the block copolymer comprises at least a first and a second charge of monovinylarene, wherein the first charge has a weight ratio to the second charge in the range of 1:2 to 2:1;
(vi) wherein the block copolymer comprises from 30 to 40 wt % diene;
(vii) wherein a monoblock formed from a first charge of monovinylarene in the block copolymer preceding the tapered blocks has a molecular weight in the range of 25,000 to 65,000 gram per mole; and
(viii) wherein the block copolymer has a blocking force of less than 200 lb.

In some embodiments, such methods may further include combining the block copolymer with an acrylate polymer.

Such methods are further illustrated by the discussion provided in the following examples.

Comparative Examples

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Materials:

Cyclohexane was dried over activated alumina and stored under nitrogen. n-Butyl lithium initiator was received at 15 wt % in cyclohexane and was diluted with cyclohexane to 2 wt %. Tetrahydrofuran (THF) was stored over activated alumina under nitrogen. Styrene and butadiene were purified over activated alumina. Epoxidized soybean oil was used as received.

Reactor:

The polymerizations were performed in a 2-gallon stainless steel reactor. The reactor is equipped with a jacket for temperature control, a double auger impeller, and baffles.

Polymerizations:

The recipes for the copolymers prepared in this study are listed in Table 1, and are expressed in a parts Per Hundred Monomer (PHM) basis. Parenthetical entries define a single simultaneous charge of both styrene and butadiene. A typical polymerization employs 2000 g of monomers, unless viscosity or heat removal limitations require lower solids.

Cyclohexane is initially charged to the reactor, followed by THF (0.10 PHM). The temperature is adjusted to ca. 60° C. and initiator is charged, followed by the first charge of styrene. After polymerization is complete a sample of the first polymerization block is coagulated in nitrogen-sparged isopropanol, filtered, dried, and analyzed by Gel Permeation Chromatography. The polymerization is continued by sequential charges of monomers and/or initiators as desired. The coupling agent is charged and reacted at 100° C. for 15 minutes. The polymer was recovered by solvent evaporation and pelletized with a single screw extruder.

Pellet Blocking Test:

Three hundred grams of sample pellets are placed in a PVC cylinder having an internal diameter of 3 inches, and a 2.5 kilogram weight is placed on top of the pellets. The cylinder and contents are placed in a forced air oven at 150° F. for 90 hours. After cooling to room temperature, the weight and cylinder are removed from the pellets and the pellet aggregate is placed in an Instron and tested in compression. The antiblocking property of the samples is specified by the pounds force required to break apart the pellet aggregate.

TABLE 1

Comparative Examples

| Test | Recipe | wt % S in Taper | wt % BD | Pre-MW | Pounds Force to Break |
|---|---|---|---|---|---|
| 1 | 0.050 $i_1$, 20$S_1$, 0.090 $i_2$, 30$S_2$, (12$B_1$/5$S_3$), (12$B_2$/4$S_4$), (13$B_3$/4$S_5$), CA | 13 | 37 | 28,000 | 3.7 |
| 2 | 0.050 $i_1$, 20$S_1$, 0.090 $i_2$, 30$S_2$, (11$B_1$/6$S_3$), (11$B_2$/5$S_4$), (12$B_3$/5$S_5$), CA | 16 | 34 | 27,400 | 3.0 |
| 3 | 0.0475 $i_1$, 20$S_1$, 0.090 $i_2$, 30$S_2$, (12$B_1$/4$S_3$), (13$B_2$/4$S_4$), (13$B_3$/4$S_5$), CA | 12 | 38 | 29,600 | 1.8 |
| 4 | 0.048 $i_1$, 30$S_1$, 0.080 $i_2$, 20$S_2$, (9$B_1$/6$S_3$), (12$B_2$/4$S_4$), (16$B_3$/3$S_5$), CA | 13 | 37 | 44,600 | 3.2 |
| 5 | 0.070 $i_1$, 30$S_1$, 0.080 $i_2$, 20$S_2$, (9$B_1$/6$S_3$), (12$B_2$/4$S_4$), (16$B_3$/3$S_5$), CA | 13 | 37 | 29,600 | 3.1 |
| 6 | 0.034 $i_1$, 30$S_1$, 0.040 $i_2$, 10$S_2$, (14$B_1$/5$S_3$), (17$B_2$/0$S_4$), (6$B_3$/18$S_5$), MeOH | 23 | 37 | 61,920 | 50.7 |
| 7 | 0.0475 $i_1$, 20$S_1$, 0.118 $i_2$, 30$S_2$, (12$B_1$/4$S_3$), (13$B_2$/4$S_4$), (13$B_3$/4$S_5$), CA | 12 | 38 | 29,200 | 12.0 |

All of the compositions and methods disclosed and claimed herein can be made and executed without undue experimentation in light of the present disclosure. While the compositions and methods of this invention have been described in terms of particular embodiments, it will be apparent to those of skill in the art that variations may be applied to the compositions and methods and in the steps or in the sequence of steps of the methods described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A composition comprising:
a monovinylarene-conjugated diene block copolymer;
wherein the block copolymer has two modes and three tapered blocks;
wherein the monovinylarene in the three tapered blocks comprises less than 25 wt % of the block copolymer;
wherein the block copolymer comprises at least a first and a second charge of monovinylarene, wherein the first charge has a weight ratio to the second charge in the range of 1:2 to 2:1;
wherein the block copolymer comprises from 30 to 40 wt % diene;
wherein a monoblock formed from a first charge of monovinylarene in the block copolymer preceding the three tapered blocks has a molecular weight in the range of 25,000 to 65,000 gram per mole; and
wherein the block copolymer is prepared by the addition of a first initiator charge and a second initiator charge, and wherein the first initiator charge contains less initiator than the second initiator charge.

2. The composition of claim 1, wherein the block copolymer comprises at least 34 wt % diene.

3. The composition of claim 1, wherein the block copolymer comprises from 36 to 38 wt % diene.

4. The composition of claim 1, wherein the monovinylarene is styrene and the diene is butadiene.

5. The composition of claim 1, wherein the monovinylarene in the three tapered blocks comprises less than 20 wt % of the block copolymer.

6. The composition of claim 1, wherein the monovinylarene contains from 8 to 18 carbon atoms and the conjugated diene contains from 4 to 12 carbon atoms.

7. The composition of claim 1, wherein the block copolymer is prepared by coupling the following polymer chains:

S1-S2-B1/S3-B2/S4-B3/S5-Li

S2-B1/S3-B2/S4-B3/S5-Li wherein S represents monovinylarene blocks, B/S represents tapered blocks of conjugated diene/monovinylarene and Li is residue from a monoalkali metal initiator.

8. The composition of claim 1, wherein the first initiator charge and the second initiator charge comprise n-butyl lithium.

9. The composition of claim 1:
wherein the monovinylarene is styrene and the diene is butadiene;
wherein the monovinylarene in the three tapered blocks comprises less than 20 wt % of the block copolymer; and
wherein the block copolymer comprises at least 36 wt % diene.

10. A method of producing a monovinylarene-conjugated diene block copolymer suited for blending with monovinylarene acrylate copolymers, comprising:
sequentially contacting under polymerization conditions at least one monovinylarene monomer, an organomonoalkali metal initiator, at least one conjugated diene monomer, and thereafter coupling with a polyfunctional coupling agent to form the block copolymer;
wherein the block copolymer has two modes and three tapered blocks;
wherein the monovinylarene in the three tapered blocks comprises less than 25 wt % of the block copolymer;
wherein the block copolymer comprises at least a first and a second charge of monovinylarene, wherein the first charge has a weight ratio to the second charge in the range of 1:3 to 3:1;
wherein the block copolymer comprises at least from 30 to 40 wt % diene;
wherein a monoblock formed from a first charge of monovinylarene in the block copolymer preceding the three tapered blocks has a molecular weight in the range of 25,000 to 65,000 gram per mole; and
wherein the block copolymer is prepared by the addition of a first initiator charge and a second initiator charge, and wherein the first initiator charge contains less of the organomonoalkali metal initiator than the second initiator charge.

11. The method of claim 10, wherein the first charge of monovinylarene has a weight ratio to the second charge of monovinylarene in the range of 1:2 to 2:1.

12. The method of claim 10, wherein the block copolymer has a blocking force of less than 175 lb.

13. The method of claim 10, wherein the block copolymer has a blocking force of less than 50 lb.

14. The method of claim 10, wherein the monovinylarene is styrene and the diene is butadiene and wherein the block copolymer comprises from 36 to 38 wt % diene.

15. A composition comprising:
a monovinylarene-conjugated diene block copolymer;
wherein the block copolymer has two modes and three tapered blocks;
wherein the monovinylarene in the three tapered blocks comprises less than 25 wt % of the block copolymer;
wherein the block copolymer comprises at least 30 wt % diene; and
wherein the block copolymer is prepared by the addition of a first initiator charge and a second initiator charge, and wherein the first initiator charge contains less initiator than the second initiator charge.

16. The composition of claim 15, wherein the block copolymer has a blocking force of less than 175 lb.

17. The composition of claim 15, wherein the block copolymer has a blocking force of less than 50 lb.

18. The composition of claim 15, wherein the monovinylarene in the three tapered blocks comprises less than 20 wt % of the block copolymer.

19. The composition of claim 15, wherein the block copolymer comprises at least a first and a second charge of monovinylarene, and wherein the first charge has a weight ratio to the second charge in the range of 1:3 to 3:1.

20. The composition of claim 15, wherein the block copolymer comprises at least a first and a second charge of monovinylarene, and wherein the first charge has a weight ratio to the second charge in the range of 1:2 to 2:1.

21. The composition of claim 15, wherein the block copolymer comprises from 36 to 38 wt % diene.

22. The composition of claim 15, wherein the block copolymer comprises at least 34 wt % diene.

23. A styrene polymer blend composition comprising:
an acrylate polymer, wherein the acrylate polymer is a blend or copolymer of methyl methacrylate and styrene; and
a monovinylarene-conjugated diene block copolymer;
wherein the block copolymer has two modes and three tapered blocks;
wherein the monovinylarene in the three tapered blocks comprises less than 25 wt % of the block copolymer;
wherein the block copolymer comprises at least a first and a second charge of monovinylarene, wherein the first charge has a weight ratio to the second charge in the range of 1:2 to 2:1;
wherein the block copolymer comprises from 30 to 40 wt % diene;
wherein a monoblock formed from a first charge of monovinylarene in the block copolymer preceding the three tapered blocks has a molecular weight in the range of 25,000 to 65,000 gram per mole; and
wherein the block copolymer is prepared by the addition of a first initiator charge and a second initiator charge, and wherein the first initiator charge contains less initiator than the second initiator charge.

24. The composition of claim 23, wherein the block copolymer comprises from 36 to 38 wt % diene.

25. The composition of claim 23, wherein the monovinylarene is styrene and the diene is butadiene, and wherein the block copolymer is prepared by coupling the following polymer chains:

S1-S2-B1/S3-B2/S4-B3/S5-Li

S2-B1/S3-B2/S4-B3/S5-Li wherein S represents monovinylarene blocks, B/S represents tapered blocks of conjugated diene/monovinylarene and Li is residue from a monoalkali metal initiator.

* * * * *